United States Patent [19]

Pierce

[11] 4,153,733

[45] May 8, 1979

[54] MICRONIZED WAFER

[75] Inventor: Chardo W. Pierce, Lubbock, Tex.

[73] Assignee: Pierce Micronizing Company, Amarillo, Tex.

[21] Appl. No.: 648,769

[22] Filed: Jan. 13, 1976

Related U.S. Application Data

[60] Division of Ser. No. 250,662, May 5, 1972, abandoned, continuation of Ser. No. 854,693, Sep. 2, 1969, Pat. No. 3,694,220, which is a continuation-in-part of Ser. No. 576,353, Aug. 31, 1966, abandoned.

[51] Int. Cl.$^2$ .......................... A23L 2/24; A23K 1/00
[52] U.S. Cl. .................... 426/72; 426/242; 426/450; 426/629; 426/630; 426/807
[58] Field of Search .................... 426/93, 457, 72, 73, 426/560, 630, 237, 144, 629, 311, 807, 241, 468, 242, 618, 623, 625, 450

[56] References Cited

U.S. PATENT DOCUMENTS

| | | | |
|---|---|---|---|
| 3,141,777 | 7/1964 | Guidarelli | 426/242 |
| 3,471,298 | 10/1969 | Hirahara | 426/455 |
| 3,512,990 | 5/1970 | Slaybaugh | 426/440 |

*Primary Examiner*—R. B. Penland
*Attorney, Agent, or Firm*—Wendell Coffee

[57] ABSTRACT

Seeds from grain are prepared for animal or human consumption by first heating with infrared radiation until soft, turgid, malleable and plastic. Then the seed are extruded by a roll to form a wafer from each seed, which wafer is suitable for storage and is readily digestible.

6 Claims, No Drawings

MICRONIZED WAFER

CROSS-REFERENCE TO RELATED APPLICATIONS

This a division of my prior application entitled Micronized Wafer filed May 5, 1972, Ser. No. 250,662, now abandoned, which, itself, was a continuation of my prior application entitled Micronizing filed Sept. 2, 1969, Ser. No. 854,693, now U.S. Pat. No. 3,694,220, which was a continuation-in-part of application entitled Feed Grain Cooker, filed Aug. 31, 1966, Ser. No. 576,353, now abandoned. Also, I have filed application Ser. No. 140,834 on May 6, 1971, now U.S. Pat. No. 3,701,670 but no claim of priority is made with regard to that application.

BACKGROUND OF THE INVENTION (1) Field of the Invention

This invention relates to the processing of food by infrared heating and then rolling whole seed.

(2) Description of the Prior Art

It is known that seed from grains are better utilized by cattle as well as humans if they are prepared. This is particularly true of certain hard grains such as grain sorghum also known as milo. Commercially this preparation often includes steaming or wet cooking as well as cracking.

It has been suggested that grain be steamed, then popped and then rolled, Reckon U.S. Pat. No. 3,173,794.

In popping corn for human consumption, it has been suggested that the corn be popped on a tilted, vibrated plate with an electrical resistance heater in the plate, Hale U.S. Pat. No. 1,839,671.

Also, it has been suggested that corn be popped by using infrared heaters, Hill U.S. Pat. No. 3,180,247.

SUMMARY OF THE INVENTION

According to this invention, the seed is placed dry, with no prior treating except cleaning, upon a tilted, vibrating plate. Upon this plate, the seed are heated by gas-fired infrared heaters for about 25 seconds. The seed are not everted or popped. Less than 1% of the grains might pop as an indicator that the remaining grains are soft, malleable, turgid, and plastic, and ready to be extruded by rollers. The heated seed are dropped into the rollers where they are extruded, or flattened by the rollers. The resulting wafers are more digestable than untreated seed and the finished product may be stored without becoming rancid or otherwise oxidizing. Although the bulk is increased, the bulk has not been increased to a point where a storage problem is created. The wafers are sturdy enough not to be crushed in storage or in hauling.

An object of this invention is to prepare seed for consumption.

Another object of this invention is to convert grain seeds into better cattle feed.

Other objects are to provide a product which is palitable, nutritious, is not subject to rancidity or staleness in storage, will withstand crumbling in storage and in hauling, and is readily digested and utilized.

The specific nature of the invention, as well as other objects, uses, and advantages thereof, will clearly appear from the following description.

DESCRIPTION OF THE PREFERRED EMBODIMENT

The process for preparing the seed is described in the prior patent applications, specifically in detail in U.S. Pat. No. 3,694,220. The preferred machinery is described in more detail in the later filed application. The process is briefly reviewed below.

The first step is cleaning the seed, e.g., by screening.

After screen-cleaning, the next step is to heat the seed for about 20 to 30 seconds with infrared radiators. I have found that if about a thousand pounds of seed are being treated an hour, about 500 cubic feet of natural gas per hour is required. Since natural gas has a heating value of 1000 BTU per cubic foot, this is about 500 BTU used in the infrared heaters for each pound of seed. In the heating process, there is no drying or parching of the seed. The coating of the seed seals the seed so that there is no apparent loss of moisture.

When the interior of the seed reach a soft, plastic, turgid and malleable state, the seed are fed directly from the heater to a roller where each seed is flattened or formed into a wafer. The interior of each seed is almost of dough-like quality so that it forms a sturdy wafer. If the seed have not been properly heated, they tend to crack or crumble. The seed tend to crack or crumble if either they have not been heated enough or if they have been heated too much.

After the rolling process, the seed is adaptable for storage in bins with no further processing. The bulk is increased. However, this increase in bulk is not sufficient to increase storage space to an uncommercial extent and the feed may be stored for a period of days, weeks, months, or until its ultimate consumption.

I have found this process is adaptable for the common cereal grains such as corn, wheat, rye, barley and sorghum. Inasmuch as grain sorghum has great commercial use and is not as adaptable to untreated feeding for cattle, grain sorghum is the grain described herein.

The amount of time the seed are exposed to the infrared radiant heat will depend upon the kind of variety of seed processed and, also, it will depend upon the conditions under which the seed grew. No two batches of seed will require the same exposure time. Even considering the same varieties of grain sorghums, I have found that some take more and some take less time, although in general the exposure to the infrared radiation for 20 to 30 seconds is a good average. The only way I have discovered to determine how long any particular batch of seed should be processed is to try some of the seed and adjust accordingly. If the seed cracked or crumbled when they came from the roller, they are not in proper condition to be fed thereto. I estimate the seed are about 325° F. after heating, although I have not been able to measure the temperature. With grain sorghums and other seed which evert or pop, to pop a few seed is a useful indication of proper control. When properly controlled, a few seed will pop just before they reach the rolls, showing that the remainder of the seed are in the soft, plastic, turgid and malleable state to be rolled to form a proper wafer. By a few seed, I mean less than one-half of one percent. Again it is emphasized that if the seed are heated until they are parched or dry, they will not be of proper soft, turgid, malleable, plastic condition to be extruded or flaked or wafered in the rolls.

The equipment used for heating the seed can be identical to that shown in my prior applications noted above. Air cleaning may be used.

After cleaning, the seed are fed onto a metal plate, which is vibrated by a pitman connected to motor-driven eccentric or crank. The metal plate is supported by leaf-springs. The plate, about 12 feed long and 2 feet wide to handle 1000 pounds of grain per hour, is tilted so that the seed as vibrated move from the cleaner to the rolling stage. A black, iron plate ½ inch thick is well suited to form the plate. Infrared radiators are positioned over the plate and gas-fired infrared radiators, as disclosed in U.S. Pat. No. 2,775,294, are well adapted for this purpose. They produce a wave length of two and one-half to three microns. Such gas-fired infrared radiators are commercially available on the market. It is desirable to place the radiators only four to seven inches above the plate for better heat transfer.

If the seed are radiated more intensely for a shorter time, difficulty is experienced in obtaining uniform heating of the seed. Normally the seed are heated as fast as possible for economic reasons. Also, extended heating times would probably produce the undesirable result of loss of moisture through the seed coating.

After the seed are heat treated, they drop directly from the end of the plate into the roller. The bearing for one of the rolls is fixed to the housing, but the bearing for the other roll is adjustably mounted by a linkage so that the distance between the rolls may be adjusted. I have found that for different kinds and varieties of seed and for different conditions of seed, it is desirable to adjust the rolls accordingly. In general, I have found that when the rolls are set spaced apart between 0.015 and 0.03 inch, it is satisfactory. In all cases I have found that the thickness of the wafer at the roll should be no greater than about 0.05 inch. There also is a correlation between the spacing of the roll and the heating of the seed. I believe that there is a change in the seed in addition to flatening the seed as they pass through the rolls. Certainly the seed coat is broken. Also the cellulose-like membrane encapsulating the starch granule is ruptured, making the starch easier to digest. Hydrolyzation occurs, converting starch to dextose and protein to amino acids. If the seed are allowed to cool after infrared radiation and before rolling, the beneficial results from the hydrolyzation do not appear to occur. Heating by other means rather than infrared radiation does not appear to produce desirable results as described. This is believed because the water content of the seed has a higher affinity for infrared radiation than the starch content or the protein content. The resistance to rancidity is believed to be the result of destruction of certain enzymes which are not destroyed by other types of heating.

I have noted that white grain varieties of grain sorghum heat faster than yellow grain varieties which heat faster than red grain varieties. I am uncertain if this is because of the difference in color or the differences in composition inherent in different varieties manifested by grain color.

There is some release of moisture at the time the cover is broken and each seed is flattened. The release of moisture is in the form of super-heated steam. Typically, sorghum will lose 6% to 8% weight in rolling. A hood and chimney over the rolls are desirable to carry the moisture away. The finished wafer will have about 8% moisture content of the entering seed. Also, I believe that the nutrients of the seed are converted or transformed into a more efficient feed for the animal. I do not know the nature, but I believe that this is part of the changes that take place in the seed so that the seed is more digestible, better utilized by the animal. The rolls should be adjusted for the kind and variety of seed and its state of softness so that a sturdy flake or wafer is formed.

As stated, the seed are more extruded in the rolls than flattened. Also, the rolls are serrated or grooved and these grooves or serrations are in a helical pattern. The helical angle of the grooves is about 20° to 30°. The helical angle is in the same direction on each roll; therefore, a cross or waffle pattern is produced on the wafer. These depressions in the rolls have a depth of about 0.015 inch and a width of about 0.04 inch and a spacing of about 0.1 inch on center. The rollers are flat between grooves. No difficulty has been experienced with the grain sticking to the rolls.

After the seed are rolled flat in the rolls, each seed puffs or rises slightly. During this rising step, the seed will absorb additives such as vitamins or protein supplement. Some varieties of sorghum seed will rise to 0.125 inch thickness after having been rolled to 0.02 inch thickness. Although most varieties do not rise this much.

After the seed have been flaked by the rolls, they are dropped onto a conveyor where they are conveyed to a storage bin.

Thus it may be seen that I have provided a superior feed for consumption.

The embodiments described above are only exemplary. Various modifications can be made in the construction, material, arrangement, and operation, and still be within the scope of my invention. The limits of the invention and the bounds of the patent protection are measured by and defined in the following claims. The restrictive description of the specific example above does not point out what an infringement of this patent would be, but are to enable the reader to make and use the invention.

SUBJECT MATTER CLAIMED FOR PROTECTION

I claim as my invention:

1. An edible food product comprising:
   (a) a small grain seed selected from a group consisting of wheat, rye, barley, and sorghum,
   (b) said seed being
      (i) flat, and
      (ii) wafer shaped,
      (iii) with a moisture content of about eight percent and having
      (iv) a ridge pattern on the surface thereof, and
      (v) a slight puffed appearance,
   (c) said seed characterized by being processed by
      (i) about 20 to 30 seconds of infrared radiation, and
      (ii) immediate flat rolling thereafter by rollers having grooves therein to form said ridge pattern.

2. An edible food product as in claim 1 with an additional inclusion of
   (d) an additive of vitamins and protein supplement absorbed in said seed.

3. An edible food product as in claim 1 wherein
   (d) the seed is sorghum.

4. An edible food product as in claim 1 wherein said 20 to 30 seconds radiation during processing was of
   (d) intensity sufficient to heat each seed to a soft, turgid, malleable and plastic condition.

5. An edible food product as in claim 4 wherein
   (e) the seed is sorghum.

6. An edible food product as in claim 5 with an additional inclusion of
   (f) an additive of vitamins and protein supplement absorbed in said seed.

* * * * *